(No Model.) 2 Sheets—Sheet 1.
H. K. HESS.
STORAGE BATTERY
No. 525,017. Patented Aug. 28, 1894.
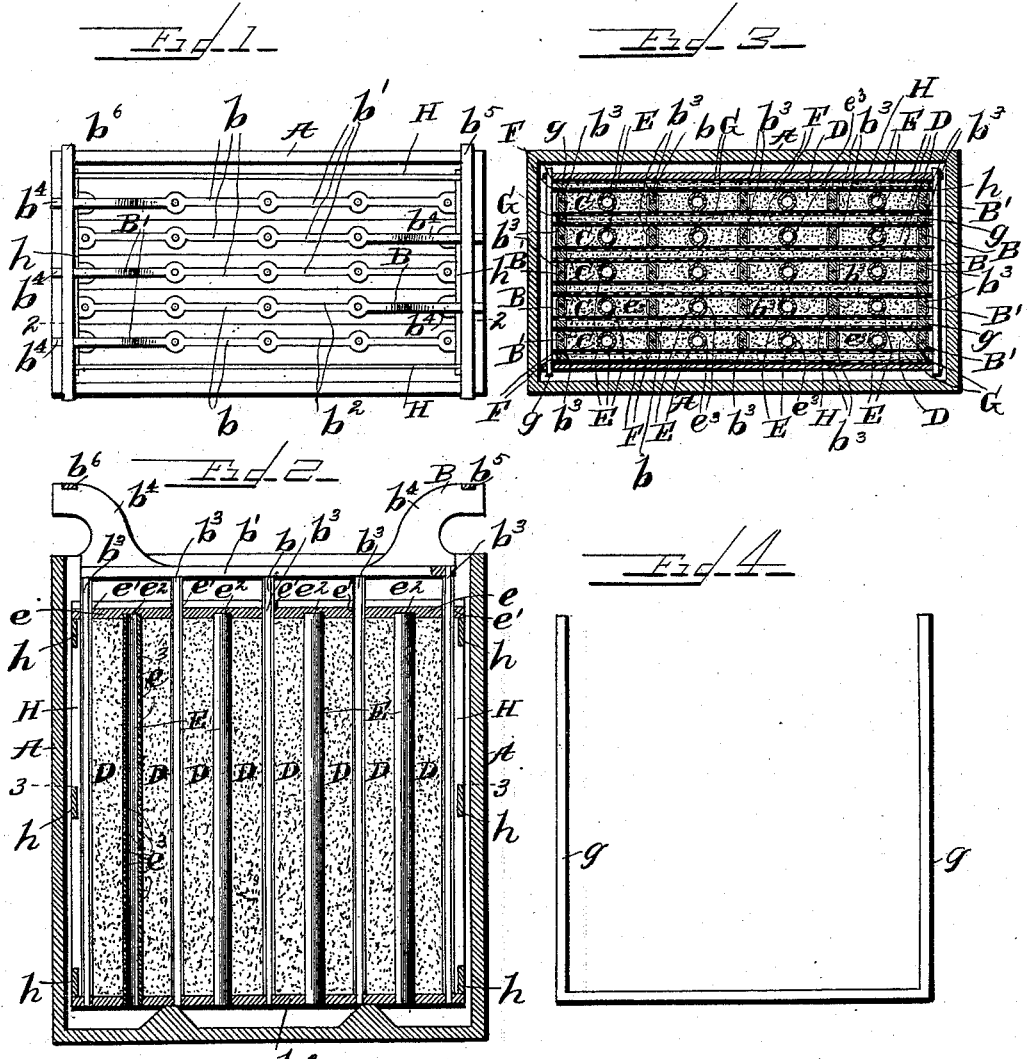

(No Model.)　　　　　　　H. K. HESS.　　　　2 Sheets—Sheet 2.
STORAGE BATTERY
No. 525,017.　　　　　　　Patented Aug. 28, 1894.
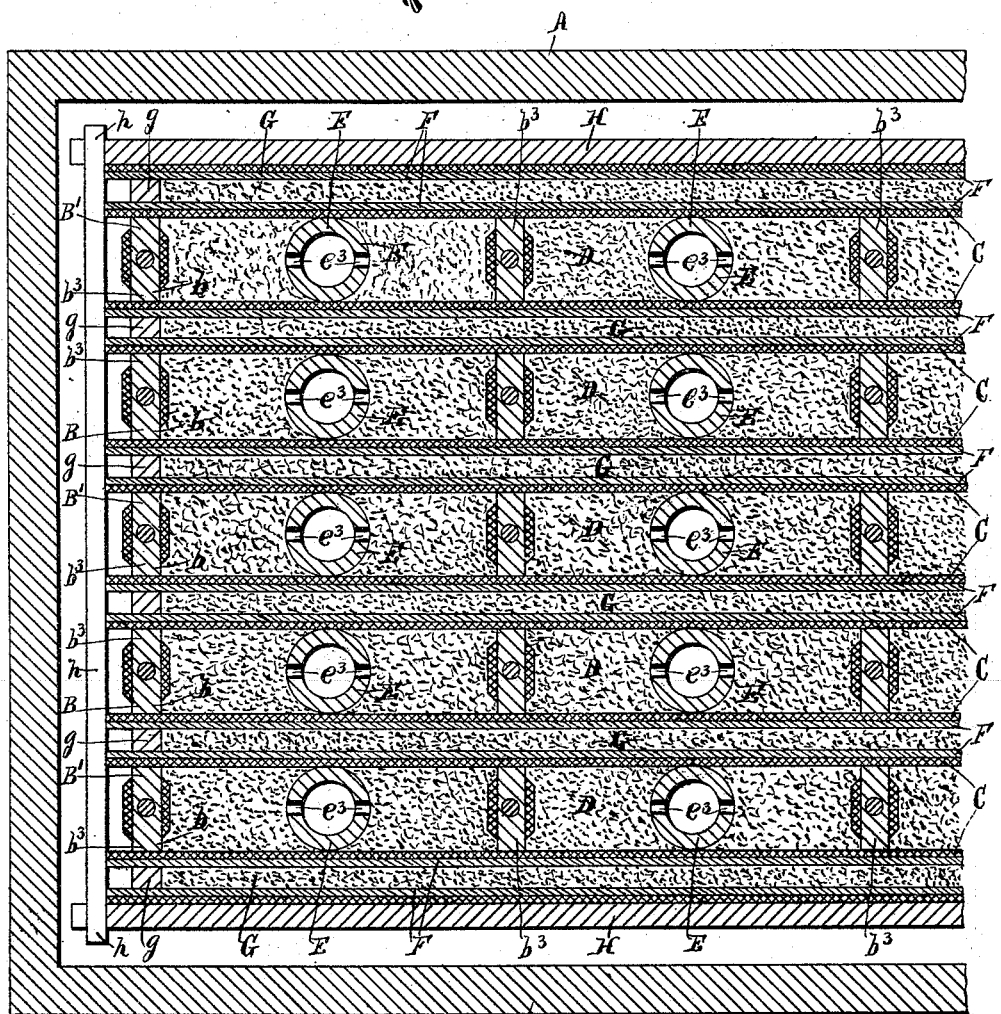
WITNESSES:　　　　　　　　　　　　　　INVENTOR
　　　　　　　　　　　　　　　　　　　Henry K. Hess
　　　　　　　　　　　　　　　　　　　　BY
　　　　　　　　　　　　　　　　　　　ATTORNEYS

UNITED STATES PATENT OFFICE.

HENRY K. HESS, OF SYRACUSE, NEW YORK.

STORAGE-BATTERY.

SPECIFICATION forming part of Letters Patent No. 525,017, dated August 28, 1894.

Application filed October 11, 1892. Serial No. 448,561. (No model.)

*To all whom it may concern:*

Be it known that I, HENRY K. HESS, of Syracuse, in the county of Onondaga, in the State of New York, have invented new and useful Improvements in Storage-Batteries, of which the following, taken in connection with the accompanying drawings, is a full, clear, and exact description.

My invention relates to improvements in storage batteries, and has for its object the production of a simple, practical and efficient battery in which the active faces of the electrodes are separated by an electrolyte-conductor of great porosity and high non-electric conductivity, which is indestructible by the acid of the electrolyte, is economically procured, and is practically and economically placed in position in the battery; and to this end it consists, essentially, in a suitable casing or shell containing an electrolyte, electrodes connected by the electrolyte and a layer of quartz-sand between the active faces of the electrodes having the separate grains or particles thereof held together by non-electric-conducting adhesive material.

The invention furthermore consists in the detail construction and arrangement of the parts, all as hereinafter more particularly described and pointed out in the claims.

In describing this invention, reference is had to the accompanying drawings, forming a part of this specification, in which, like letters indicate corresponding parts in all the views.

Figure 1 is a top plan view of one form of my invention. Fig. 2 is a vertical sectional view, taken on line 2—2, Fig. 1. Fig. 3 is a horizontal sectional view, taken on line 3—3, Fig. 2. Fig. 4 is a detached elevation of the frame interposed between the adjacent sides of two of the electrodes for retaining the electrolyte-conductor in position. Fig. 5 is an enlarged horizontal sectional view of a portion of the battery, further illustrating the detail construction and arrangement thereof. Fig. 6 is a horizontal sectional view of a portion of a modified form of my invention; and Fig. 7 is a face view of one of the electrode conductors or grids used in the construction of battery shown at Fig. 6.

It is well known that in storage batteries as at present constructed, the confining plate or other device for confining the active material in position, and separating the electrodes is more or less liable to become so affected or destroyed by the action of the acid in the electrolyte and by the jarring incidental to the use of the battery on street cars and similar conveyances, as to greatly impair its efficiency and permit the active material to fall downwardly from the electrodes to the base of the battery and finally short-circuit the same, and to conduct the electrolyte with less certainty and positiveness than is required in a practical and efficient battery.

By my invention, I interpose a layer of quartz-sand between the adjacent active surfaces of the electrodes, and, as quartz-sand is indestructible by the acid of the electrolyte, may be firmly packed in position so as to occupy all of the space between the active surfaces, and is, even when closely packed, very porous, the action of the layer of quartz-sand is not at all impaired by continued use, and the active material is firmly confined in position and is supplied positively and effectively with the necessary amount of electrolyte.

In order that the separate grains or particles of the layers of quartz-sand, when packed in position as described, of my improved battery may be held in position without liability of undue movement thereof produced by the passage of gas therethrough, the jarring of the battery in use or other cause, I preferably mix with the sand a suitable amount of a suitable adhesive non-electric-conducting material as shellac, rubber, &c., which coats the separate grains or particles of sand together without materially filling the interstices between the grains and thus preventing the passage of the electrolyte.

At Figs. 1, 2, 3, 4 and 5 I have illustrated the form of my invention which forms the subject matter of my application of even date herewith, Serial No. 448,562. This battery consists of an outer casing —A— of suitable non-electric-conducting material, as hard rubber, glass, &c., containing any desirable electrolyte, and positive and negative electrodes —B—B'— of suitable material inserted within the electrolyte.

The electrolyte preferably consists of water mixed with a desirable amount of sulphuric acid and the electrodes —B—B'— are each formed with a conducting frame —b— having top and bottom bars —b'—b²—, and separated upwardly extending bars —b³— having their opposite ends secured to said top and bottom bars.

The active material —C—C— is applied in layers to the opposite faces of the conductors, and consequently, adheres to the outer edges of the upright bars —b³— as clearly seen at Figs. 3 and 5.

Interposed between the separated layers —C—C— of active material applied to the outer faces of the conductors —b— is a layer —D— of quartz-sand, which, as previously stated, is indestructible by the acid of the electrolyte and is formed of separate grains or particles held together by non-electric-conducting adhesive material.

The sand of the layer —D— is prevented from downward feeding by the bottom bar —b²— upon which it rests, and is firmly packed in position so as to occupy all of the space between the layers —C—C— and effectually confine the active material in position, and to absolutely prevent the same from falling downwardly between the bars —b³— of the conductor —b—.

The sand, although firmly packed, as described, between the layers —C—C—, and having its separate grains or particles held together by non-electric-conducting adhesive material is very porous and permits the ready passage of the electrolyte to the opposite surfaces or faces of said layers.

As described and shown in my aforesaid application, Serial No. 448,562, I do not, in this form of my invention, rely entirely upon the porosity of the electrolyte-conducting layer —D— of quartz-sand, but interpose between the layers —C—C— electrolyte-feeding-tubes —E—E— which are arranged between the lengthwise bars —b³— of the conductors —b—.

The lower extremities of the tubes —E— are supported in the lower conductor bar —b²— and their outer ends in sockets in an insulating bar —e— arranged beneath the conductor bar —b'— and formed with perforations —e'— through which the upper ends of the bars —b³— are passed.

The ends of the tubes —E—E— are closed by the portions —e²— —b⁴— of the bar —e'— directly above said ends, and their upright walls are formed with perforations —e³— of suitable size, to discharge the electrolyte without permitting the entrance of the quartz-sand forming the electrolyte-conducting layer. I do not, however, restrict my present invention to these electrolyte-feeding-tubes —E—E— as they may be entirely dispensed with without departing from the spirit thereof.

At the outside of each of the electrodes are layers —F—F— of suitable non-electric-conducting porous material, as asbestos paper which are arranged in close contact with the layers —C—C— of active material. These layers F F may also be entirely dispensed with without departing from the spirit of my invention.

Interposed between the adjacent faces of the layers —F— at the outside of the electrodes, are layers —G— of quartz-sand which serve to permit the upper escape of any gas passed between said layers —F—F— and are formed of separate grains or particles held together by non-electric-conducting adhesive material.

The sand composing the layers —G— may be prevented from escapement by forming the edges of the layers —G—G— slightly thicker than the remaining portions thereof, or by suitable frames —g—, Fig. 4, interposed between the layers —F—F—.

—H—H— are end plates of hard-rubber or similar material arranged against the outer faces of the outer or end electrodes or against the outer faces of the end layers —G—G— at the outside of said end electrodes and —h—h— are cross bars also of rubber or similar material having their opposite ends secured to said plates for holding the same firmly against the outer electrodes or layers —G—G—, and firmly securing the electrodes together and preventing the escape of the sand.

The layers —D—G— of quartz-sand may be placed in position in any desired manner, but as fully described in my aforesaid application Serial No. 448,552 I preferably place one of the conductors —b—, provided with the tubes —E—E— and the insulating cross bar —e—, upon a suitable flat support or table and then fill in the quartz-sand having its separate grains or particles held together by non-electric-conducting adhesive material between the bars —b³— and the tubes —E— and firmly press the same into position.

The layer of active material with which one face of this conductor is to be provided, is then applied thereto in the usual manner and is firmly pressed against the outer face of the layer of sand and against the outer edges of the bars —b³— and the outer surfaces of the tubes —E—. The conductor is then reversed upon said table and the opposite layer —C— of active material applied in the same manner and the layers —F—F— of non-electric-conducting porous material are then arranged at the outside of the outer faces of the layers —C—C— of active material and firmly forced thereagainst.

A second electrode constructed in like manner is arranged at the side of the former one and a layer —G— of quartz-sand having its separate grains or particles held together by non-electric-conducting adhesive material is interposed between the adjacent layers —F—F— between said electrodes. As many additional electrodes as may be desired are then similarly prepared and arranged until the shell —A— is full. Unless the electrodes within the case —A— entirely fill the same, the said electrodes must be securely tied together, as previously described. These electrodes are formed with the usual terminals —$b^4$— which are connected by the positive and negative bars —$b^5$—$b^6$—.

It will be noted that in the form of my invention just described, each of the electrodes is formed with separated interior active surfaces, between which is interposed a layer —D— of quartz-sand having separate grains or particles thereof held together by non-electric-conducting adhesive material, but I do not, however, restrict my invention to the use between active interior faces of the electrodes of a layer of quartz-sand having the separate grains or particles thereof held together by non-electric-conducting adhesive material, since frequently it is desirable to use my electrolyte-conductor with electrodes of different construction.

At Fig. 6 I have shown a horizontal sectional view of a modified form of my invention, in which, the electrodes —I— are provided with active surfaces at their outer sides and are separated by layers —I'— of quartz-sand, having the separate grains or particles thereof held together by non-electric-conducting adhesive material which layers I', as in the previously described form of my invention, serve to firmly confine the active material in position and to positively and efficiently conduct the electrolyte thereto.

The form of electrode —I— illustrated at Fig. 6, is a very simple and ordinary construction, and consists of a conductor —$i'$— formed with a series of openings —$i^2$— therethrough into which enter portions of the layers —$I^2$— of the active material for aiding the support of said layer. In this latter form of battery my improved electrolyte-conducting layer I of quartz-sand having the separate grains or particles thereof held together by non-electric-conducting adhesive material is arranged between the active surfaces of adjacent electrodes, but it will be readily understood that as previously described, should each of these electrodes be provided with interior active surfaces, a layer of quartz-sand having the separate grains or particles thereof held together by non-electric-conducting adhesive material would be interposed between the same.

The operation of my invention will be readily perceived from the foregoing description and upon reference to the accompanying drawings, and it will be particularly noted that the layer of quartz-sand having the separate grains or particles thereof held together by non-electric-conducting adhesive material which forms the essential of my invention, is indestructible by the acid of the electrolyte, may be firmly packed in position so as to occupy all of the space between the surfaces of the electrodes, and is, even when closely packed, very porous and when continually used does not lose its efficiency, and consequently, serves to firmly confine the active material in position and to positively and effectively supply the same with the necessary amount of the electrolyte.

As various forms of electrodes may be used with my invention, I do not, as previously stated, restrict the same to any particular form of electrode.

Having thus fully described my invention, what I claim as new, and desire to secure by Letters Patent, is—

1. In a battery, the combination with the active material; of a layer of quartz-sand imposed against the face of the active material, and having the separate grains or particles thereof held together by non-electric-conducting adhesive material, substantially as and for the purpose set forth.

2. In a battery, the combination with an electrode having separated layers of active material applied to separated faces thereof, of a layer of quartz-sand interposed between the separated layers of active material, and having the separate grains or particles thereof held together by non-electric-conducting adhesive material, substantially as and for the purpose specified.

3. In a battery, the combination of a conducting frame or grid, a layer of active material applied to one face of the conducting frame or grid, a layer of quartz-sand imposed against one face of the active material, and having the separate grains or particles thereof held together by non-electric-conducting adhesive material, a layer of non-electric-conducting porous material imposed against the opposite face of the active material, and a layer of quartz-sand imposed against the outer face of the layer of non-electric-conducting porous material, and having the separate grains or particles thereof held together by non-electric-conducting adhesive material, substantially as and for the purpose set forth.

4. In a battery, the combination with a conducting frame or grid, and separated layers of active material applied to said conducting frame or grid; of a layer of quartz-sand interposed between the layers of the active material, and having the separate grains or particles thereof held together by non-electric-conducting adhesive material, layers of non-electric-conducting porous material at the outside of the layers of active material, and layers of quartz-sand at the outside of said layers of non-electric-conducting porous material, and having the separate grains or particles thereof held together by non-electric-conducting adhesive material, substantially as and for the purpose specified.

In testimony whereof I have hereunto signed my name, in the presence of two attesting witnesses, at Syracuse, in the county of Onondaga, in the State of New York, this 26th day of September, 1892.

HENRY K. HESS.

Witnesses:
CLARK H. NORTON,
M. BAXTER.